United States Patent
Nishii et al.

[11] Patent Number: 5,879,424
[45] Date of Patent: Mar. 9, 1999

[54] OPTICAL MICRO-MACHINING METHOD OF GLASS

[75] Inventors: Junji Nishii; Hiroshi Yamanaka, both of Ikeda, Japan

[73] Assignee: Agency of Industrial Science & Technology, Tokyo, Japan

[21] Appl. No.: 857,262

[22] Filed: May 16, 1997

[30] Foreign Application Priority Data

May 24, 1996 [JP] Japan .................................. 8-152986

[51] Int. Cl.$^6$ .......................... C03C 15/00; C03C 23/00
[52] U.S. Cl. .................. 65/31; 65/33.2; 65/61; 65/111; 216/80; 216/87; 216/97; 216/99
[58] Field of Search ............... 65/31, 33.1, 33.2, 65/61, 111, 112, 268, 429, 472; 501/13, 42, 900, 905, 53, 55, 73; 216/74, 79, 76, 80, 97, 99, 87, 62, 101, 109, 31; 430/329, 541

[56] References Cited

U.S. PATENT DOCUMENTS

| | | |
|---|---|---|
| 4,194,916 | 3/1980 | Kumata et al. . |
| 4,407,709 | 10/1983 | Enjouji et al. . |
| 4,703,019 | 10/1987 | Abe et al. . |
| 4,973,345 | 11/1990 | France .......................................... 65/31 |
| 5,090,984 | 2/1992 | Szczyrbowski et al. . |
| 5,287,427 | 2/1994 | Atkins et al. . |
| 5,314,522 | 5/1994 | Kondo et al. ............................. 65/33.2 |
| 5,322,538 | 6/1994 | Kondo et al. ............................. 65/33.2 |
| 5,374,291 | 12/1994 | Yabe et al. ................................ 65/33.2 |
| 5,637,126 | 6/1997 | Ema et al. . |

FOREIGN PATENT DOCUMENTS 56-33779  8/1981  Japan .

Primary Examiner—Steven P. Griffin
Attorney, Agent, or Firm—Nikaido Marmelstein Murray & Oram LLP

[57] ABSTRACT

An optical micro-machining method of glass characterized in that after light is applied to glass including $SiO_2$ and 30–70 mol % $GeO_2$, the irradiated area is removed by etching.

24 Claims, 1 Drawing Sheet

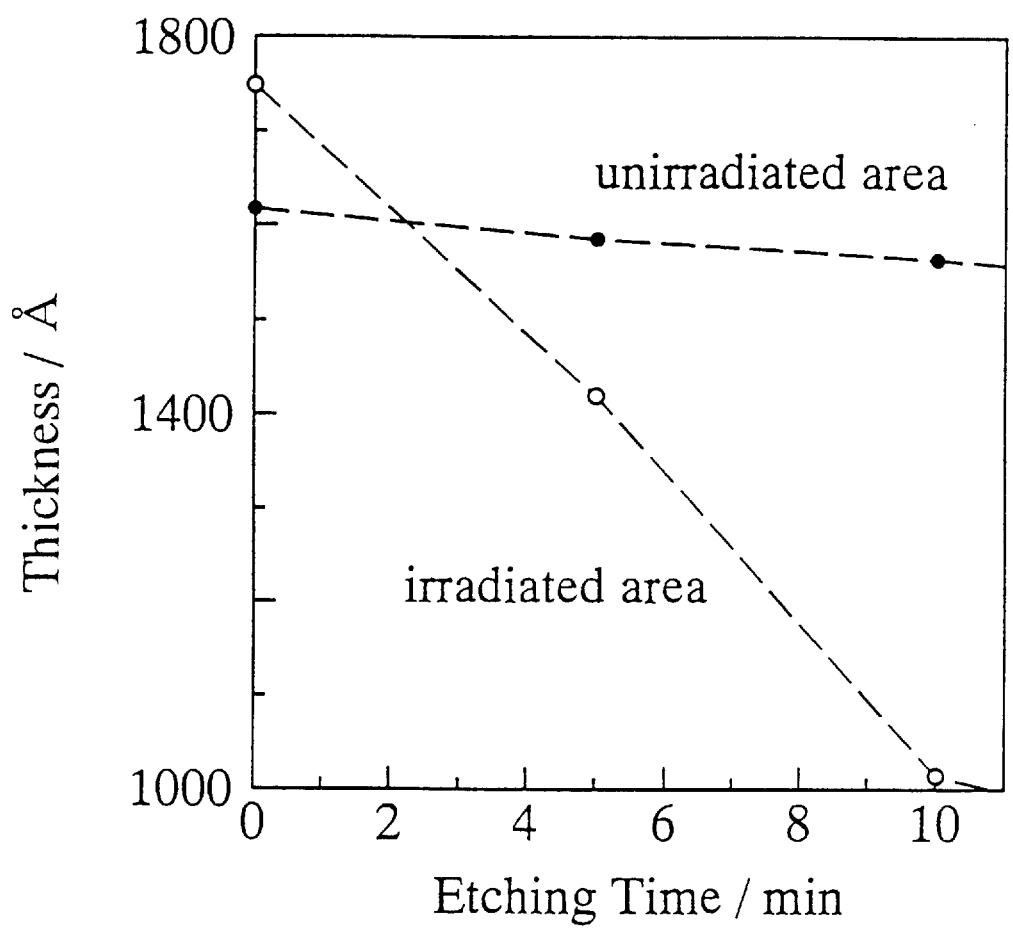

OPTICAL MICRO-MACHINING METHOD OF GLASS

BACKGROUND OF THE INVENTION

This invention relates to an optical micro-machining method of glass by utilizing selective etching due to irradiation of light.

It is known that when a strong ultraviolet ray is applied to oxide glass, particularly $SiO_2$ type glass, its density and refractive index become higher. It is also known that a similar phenomenon occurs on the surface of glass into which various ions such as transition metal ions are implanted. Generally, the area in which such a high density occurs has lower chemical durability than other areas. Therefore, when etching is carried out by an aqueous hydrofluoric acid solution, selective etching takes place in the light irradiated area. However, because the etching rate of light radiated glass is only about three times that of unprocessed glass, this rate is not yet sufficient for forming a diffraction grating or an optical waveguide on the glass surface or forming a fine pattern of an inorganic resist film on a semiconductor substrate.

SUMMARY OF THE INVENTION

It is an object of the present invention to provide an optical micro-machining method of glass which can form a diffraction grating and an optical waveguide within a short time or can conduct fine patterning when the surface of oxide glass is subjected to light irradiation and then etching.

The inventors of the present invention have conducted studies in view of the prior art technologies described above, and have discovered that when etching is carried out after light is applied to the surface of oxide glass made of $GeO_2$—$SiO_2$, a great difference in etching rate is found between the light irradiated area and the light non-irradiated area.

In other words, the glass micro-machining method according to the present invention for accomplishing the object described above is characterized in that after light is applied to $GeO_2$ —$SiO_2$ glass, the light irradiated area is removed by etching.

When light is applied to $GeO_2$—$SiO_2$ glass, the etching rate of the light irradiated area can be drastically increased in comparison with the light non-irradiated area, and the light irradiated area can be selectively etched within a short time. Therefore, it becomes possible to form a diffraction grating or an optical waveguide from glass, or to conduct fine patterning to glass, by carrying out etching after light is applied to the glass.

BRIEF DESCRIPTION OF THE DRAWING

The figure is a graph showing the change in the film thickness of a glass material obtained in Example 1 of the present invention with the passage of time when etching is carried out for a predetermined time by an aqueous HF solution after light is applied to the glass material from an excimer laser.

DETAILED DESCRIPTION OF THE PREFERRED EMBODIMENTS

In the present invention, optical micro-machining of glass is carried out by applying light having photon energy or an energy density capable of inducing any structural change in the glass, and etching the glass surface in either a liquid phase or a gaseous phase by utilizing the difference in etching rate between the light irradiated area and the light non-irradiated area.

Glass used for optical micro-machining of the present invention is $SiO_2$ type oxide glass. This glass can be produced by sputtering, sol-gel method, chemical vapor deposition, etc, but particularly glass produced by sputtering using an argon gas is preferable. To increase the difference in etching rate between the light irradiated area and the light non-irradiated area, this $SiO_2$ glass must contain $GeO_2$. The $GeO_2$ content in glass is generally 20 to 95 mol %, and more preferably 30 to 70 mol %. When the $GeO_2$ content is too small, a large difference in etching rate cannot be created between the light irradiated area and the light non-irradiated area, and when the $GeO_2$ content is too great, on the contrary, durability of glass drops to an unpractical level. Sputtering can be carried out in a customary manner, and its condition is not particularly limited. However, an oxygen-containing argon gas having an oxygen volume fraction of 0 to 30% is preferably used. When an argon gas having an oxygen volume fraction of more than 30% is used, a large difference in etching rate may not be observed between the light irradiated area and the light non-irradiated area.

Light used for optical micro-machining of the present invention preferably has photon energy greater than band gap energy of glass, or when photon energy is smaller than band gap energy, the light preferably has an energy density capable of generating inter-band transition in glass after going through a multi-photon absorption process. More concrete examples of such light are pulse lights of laser beam of excimer laser, higher harmonics of YAG (Yttrium Aluminum Garnet) laser, and higher harmonics of dye laser. The laser beam of the excimer laser include ArF (193 nm), KrF (248 nm), XeCl (308 nm) and XeF (350 nm). The higher harmonics of the YAG laser includes the third harmonics (355 nm) and the fourth harmonics (266 nm), but its wave length is not particularly limited. The energy density of these laser beams preferably ranges from about 5 to 1,000 $mJ/cm^2$. When the energy density of light is too small, a great difference in etching rate may not be observed between the light irradiated area and the light non-irradiated area, so the intended micro-machining operation may not be conducted. When the energy density of light is too great, on the other hand, ablation is likely to occur in glass.

Fluorine compounds can be used at the time of etching of glass after irradiation of light described above. Examples of the fluorine compounds are aqueous solutions of fluorine compounds such as hydrofluoric acid (HF), a mixed acid of hydrofluoric acid and sulfuric acid, and gases of the fluorine compounds such as sulfur fluoride ($SF_6$), and nitrogen fluoride ($NF_3$), and so forth.

According to the present invention, an optical micro-machining can be applied to the glass surface by irradiating light to the surface of $SiO_2$ type oxide glass produced by the sputtering method preferably using argon gas, the sol-gel method, the chemical vapor deposition method, etc, and then removing only the light radiated area by the etching processing using the fluoride compound. Therefore, the optical micro-machining method of glass according to the present invention can be applied to various optical devices, optical memory, hologram memory media, and so forth.

Hereinafter, Examples of the present invention and Comparative Examples will be given so as to further clearly represent the features of the present invention.

EXAMPLE 1

A glass thin film consisting of 50 mol % of $GeO_2$ and 50 mol % of $SiO_2$ and having a thickness of 1,620 Å (angstrom)

was deposited on a monocrystal silicon substrate by a sputtering method under the condition where the composition of the atmospheric gas was 3% oxygen and 97% argon, the flow rate of the gas was 3 cc/min, and the pressure inside the chamber was $10^{-2}$ torrs. The composition of this thin film was analyzed by X-ray photoelectron spectroscopy. That this thin film was amorphous was confirmed by thin film X-ray diffraction.

After 600 pulses of pulse light having a wavelength of 193 nm and an energy density of 20 mJ/cm$^2$ were applied from an ArF excimer laser to a part of the resulting glass thin film, the glass thin film was immersed in a 0.05% aqueous HF solution, and the thickness of the thin film was measured at a predetermined cycle by an elipsometer. The FIGURE shows the change of the film thickness with the immersion time. The elution rate of the light irradiated area and that of the non-radiated portion were 5.2 Å/min and 73.4 Å/min, respectively, and their ratio was 1: 14.1.

After the ArF laser was applied to the glass thin film through a phase mask of a 1.06 um pitch that allowed the passage of only the primary diffraction light, the glass thin film was etched by the aqueous HF solution. Consequently, a pattern similar to that of the phase mask was written to the thin film surface, and it was confirmed that this pattern formation thin film had the function of an optical diffraction grating.

EXAMPLE 2

A glass thin film consisting of 30 mol % GeO$_2$ and 70 mol % of SiO$_2$ and having a thickness of 1,450 Å (angstrom) was formed on a monocrystal silicon substrate in the same way as in Example 1. After 2,400 pulses of pulse light having a wavelength of 248 nm and an energy density of 50 mJ/cm$^2$ were applied to a part of this glass thin film from a KrF excimer laser, the glass thin film was immersed in a 0.05% aqueous HF solution, and the film thickness was measured at a predetermined cycle by an elipsometer. The elution rate of the light irradiated area was greater than that of the light non-irradiated area, and their ratio was 1:4.5.

EXAMPLE 3

A glass thin film consisting of 70 mol % GeO$_2$ and 30 mol % of SiO$_2$ and a thickness of 1,850 Å (angstrom) was formed on a monocrystal silicon substrate in the same way as in Example 1. After 2,400 pulses of pulse light having a wavelength of 248 nm and an energy density of 50 mJ/cm$^2$ were applied to a part of the glass thin film from a KrF excimer laser, the glass thin film was immersed in a 0.05% aqueous HF solution, and the thickness of the film thickness was measured at a predetermined cycle by an elipsometer. The elution rate of the light irradiated area was greater than that of the non-irradiated area, and their ratio was 1:8.7.

Comparative Example 1

A glass thin film consisting of 100% SiO$_2$ and having film thickness of 1,550 Å (angstrom) was produced in the same way as in Example 1. After 1,200 pulses of pulse light having a wavelength of 193 nm and an energy density of 20 mJ/cm$^2$ were applied to a part of this glass thin film, the glass thin film was immersed in a 0.05% aqueous HF solution, and the thickness of the thin film was measured at a predetermined cycle by an elipsometer. However, the difference in elution rate could be hardly observed between the irradiated area and the non-irradiated area.

Comparative Example 2

A glass thin film consisting of 100% GeO$_2$ and having a thickness of 2,010 Å (angstrom) was produced in the same way as in Example 1. After 1,200 pulses of pulse light having a wavelength of 248 nm and an energy density of 50 mJ/cm$^2$ were applied to a part of this glass thin film from a KrF excimer laser, the glass thin film was immersed in a 0.05% aqueous HF solution and the thickness of the thin film was measured at a predetermined cycle by an elipsometer. However, the luster of the surface of the thin film was lost due to the immersion into the aqueous HF solution, and the evaluation by the elipsometer was not possible. This was presumably because durability of GeO$_2$ glass to the acid was extremely low.

What is claimed is:

1. A method of optically micro-machining a glass, comprising
   providing a glass comprising SiO$_2$ and 30 to 70 mol % GeO$_2$,
   applying light to an area on a surface of the glass to produce a light irradiated area, and
   etching the glass in the light irradiated area.

2. The method of claim 1, wherein the glass has a band gap energy and the light in said applying step has a photon energy which is greater than the band gap energy.

3. The method of claim 2, wherein the light in said applying step is selected from the group consisting of a laser beam of an excimer laser, higher harmonics of a YAG laser and higher harmonics of a dye laser, wherein the light has an energy density of 5 to 1000 mJ/cm$^2$.

4. The method of claim 3, wherein the glass is produced by a sputtering method using an argon gas having an oxygen volume fraction of 0 to 30%.

5. The method of claim 4, wherein said etching step is conducted using a fluorine compound.

6. The method of claim 3, wherein said etching step is conducted using a fluorine compound.

7. The method of claim 2, wherein the glass is produced by a sputtering method using an argon gas having an oxygen volume fraction of 0 to 30%.

8. The method of claim 7, wherein said etching step is conducted using a fluorine compound.

9. The method of claim 2, wherein said etching step is conducted using a fluorine compound.

10. The method of claim 1, wherein the light in said applying step has an energy density which is capable of generating an inter-band transition in the glass via a multi-photon absorption process.

11. The method of claim 10, wherein the light in said applying step is selected from the group consisting of a laser beam of an excimer laser, higher harmonics of a YAG laser and higher harmonics of a dye laser, wherein the light has an energy density of 5 to 1000 mJ/cm$^2$.

12. The method of claim 11, wherein the glass is produced by a sputtering method using an argon gas having an oxygen volume fraction of 0 to 30%.

13. The method of claim 12, wherein said etching step is conducted using a fluorine compound.

14. The method of claim 11, wherein said etching step is conducted using a fluorine compound.

15. The method of claim 10 wherein the glass is produced by a sputtering method using an argon gas having an oxygen volume fraction of 0 to 30%.

16. The method of claim 15, wherein said etching step is conducted using a fluorine compound.

17. The method of claim 10, wherein said etching step is conducted using a fluorine compound.

18. The method of claim 1, wherein the light in said applying step is selected from the group consisting of a laser beam of an excimer laser, higher harmonics of a YAG laser and higher harmonics of a dye laser, wherein the light has an energy density of 5 to 1000 mJ/cm$^2$.

19. The method of claim 18, wherein the glass is produced by a sputtering method using an argon gas having an oxygen volume fraction of 0 to 30%.

20. The method of claim 19, wherein said etching step is conducted using a fluorine compound.

21. The method of claim 18, wherein said etching step is conducted using a fluorine compound.

22. The method of claim 1, wherein the glass is produced by a sputtering method using an argon gas having an oxygen volume fraction of 0 to 30%.

23. The method of claim 22, wherein said etching step is conducted using a fluorine compound.

24. The method of claim 1, wherein said etching step is conducted using a fluorine compound.

\* \* \* \* \*